W. A. TURBAYNE.
ELECTRICAL SYSTEM OF DISTRIBUTION.
APPLICATION FILED FEB. 25, 1908.
969,007.
Patented Aug. 30, 1910.
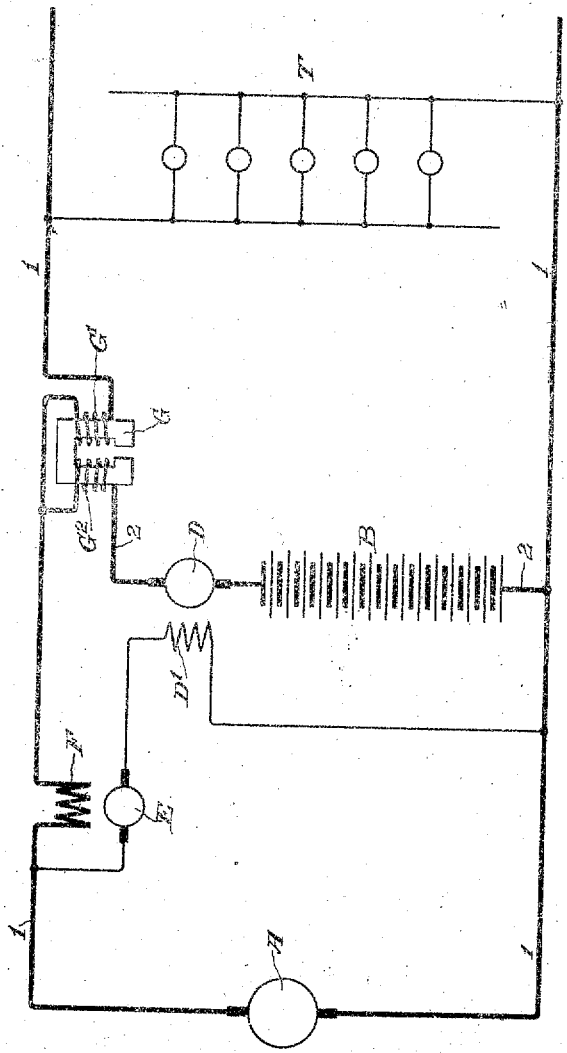

UNITED STATES PATENT OFFICE.

WILLIAM A. TURBAYNE, OF LANCASTER, NEW YORK, ASSIGNOR TO GOULD STORAGE BATTERY COMPANY, A CORPORATION OF NEW YORK.

ELECTRICAL SYSTEM OF DISTRIBUTION.

969,007. Specification of Letters Patent. Patented Aug. 30, 1910.

Application filed February 25, 1908. Serial No. 417,753.

*To all whom it may concern:*

Be it known that I, WILLIAM A. TURBAYNE, a citizen of the United States, and a resident of Lancaster, in the county of Erie, State of New York, have invented certain new and useful Improvements in Electrical Systems of Distribution, of which the following is a specification.

My invention relates to electrical systems of distribution and more especially to systems in which a compensatory battery is employed together with means for regulating the action of the battery in accordance with changes in the electrical conditions of such systems.

The usual type of electric generator, in which a wound armature rotates within the influence of massive poles upon which are concentrated the magnetizing windings possesses characteristics that are disadvantageous in connection with the duties imposed upon boosters such as are used in conjunction with storage batteries for maintaining regulation to a close average load upon a generating system. To accomplish these duties satisfactorily means must be provided which will be sufficiently responsive to practically instantaneously control the battery action in a manner to prevent the load variations, above or below the approximate desired normal value, from reaching the generator.

Great trouble has been experienced from the fact that the regulating apparatus was not sufficiently responsive to cause the battery to take the large and very sudden fluctuations of load which fall upon many systems, and the generator would be suddenly called upon to take excessive variations of load.

The objects of my invention are, among others, to provide means which will not only cause the battery to closely respond to those gradual and more or less permanent changes in the electrical condition of the system but which will also cause the battery to respond to those large and sudden fluctuations which are otherwise very detrimental to the successful operation of such systems.

In general it is my object to provide a system in which quicker action and more close regulation of the battery are obtained and in which the efficiency is materially increased. With this end in view I provide a coil the current in which varies in accordance with the current in the main distribution circuit of the system. In series with the battery I place a second coil which is in inductive relation to the first and hence any sudden change of current in the first coil causes an electromotive-force to be set up in the second coil in the proper direction, and of such a value as to quickly and efficiently regulate the battery action. Such a regulating device or booster used in connection with another booster for regulating the battery responsive to the gradual and more or less permanent changes in the condition of the system, forms a simple and efficient regulating means which is responsive to all load changes of the system.

These and various other novel features of my invention will be more fully described hereinafter and shown in the accompanying drawing which represents diagrammatically one embodiment of my invention.

In the drawings A represents a main generator having connected thereto the main distribution circuit 1, 1, feeding the translating devices T. Connected across the circuit 1, 1, is the battery circuit 2, with the battery B therein. Also in the circuit 2, in series with the battery is the booster D provided with a field winding D' in series with a counter-electromotive-force machine E which is connected across the main circuit, 1, 1. The counter-electromotive-force machine E is provided with a field winding F in series in the main circuit. The booster D and counter-electromotive-force machine E are driven in any convenient and well-known manner, as by shunt motors (not shown). When the system is working under normal conditions the field strength of coil F is just sufficient to cause the counter-electromotive-force machine or exciter E to generate an electromotive-force equal to and opposing that at the terminals of the generator A, therefore no current will flow through the field D' and the booster D will run idly. However, if the current in the circuit, 1, 1, increases, the strength of the field at F will increase and the electromotive-force of the exciter E will be greater than the difference of potential across the circuit, 1, 1, so that a current will flow in the coil D' and the booster D will generate an electromotive-force in the proper direction to cause the battery to discharge into the main circuit, 1, 1, to take the extra load imposed thereupon. If the load upon the generator should decrease below normal the reverse operations would take place and the battery would be charged from the circuit, 1, 1. Such an arrangement, however, is not efficiently responsive to those large and sudden variations of load which may be imposed upon such systems. I have, therefore, provided a transformer G, one coil or element G' of which is placed in series in the circuit, 1, 1, and the other coil or element $G^2$ of which is placed in the circuit 2, in series with the battery B, and booster D. These coils, G' and $G^2$ are in inductive relation to each other, so that any sudden increase of current in the coil G' will cause an electromotive-force to be generated in the coil $G^2$ to boost the voltage of the battery circuit 2 and thus cause the battery to supply the extra current instead of allowing the same to fall upon the generator A. If a sudden decrease of current in the circuit, 1, 1, should occur the reverse operation of the boosting device G would take place. The greater and the more rapid the change of current in, or the change of load upon the circuit, 1, 1, the greater and more rapid will be the action of the boosting device G to properly regulate the battery action. Thus the electromotive force generated in the coil $G^2$ is responsive to and varies in accordance with the rate of change of current in the coil G', and the booster G is responsive to the rate of change of load on the system. Thus the booster or boosting device G will take care of all sudden fluctuations of load upon the system while the less sudden variations thereof will be taken care of by the booster D.

Having thus fully and clearly described my invention what I claim as new and desire to protect by Letters Patent, is:

1. In an electrical system of distribution, a main generator, a main distribution circuit connected thereto, a battery and booster in operative relation to said circuit, a transformer having its primary in the main distribution circuit and its secondary in series with the battery.

2. In an electrical system of distribution, a main generator, a main distribution circuit connected thereto, a battery and booster in operative relation to said circuit, means for regulating the action of the booster responsive to variations in the electrical condition of the system, and a transformer in series in the main circuit and having its secondary in series with the battery.

3. In an electrical system of distribution, a main generator, a main distribution circuit connected thereto, a storage apparatus and booster in operative relation thereto, a coil receiving fluctuations of current in the main circuit and a second coil in inductive relation to said first mentioned coil and in series with the storage apparatus.

4. In an electrical system of distribution, a main generator, a main distribution circuit connected thereto, a battery and booster in operative relation thereto, means for regulating the action of the booster responsive to fluctuations of current in the main circuit, a coil receiving fluctuations of current in the main circuit and a coil in inductive relation thereto in series with the battery.

5. In an electrical system of distribution, a main generator, a main distribution circuit connected thereto, a battery and booster in operative relation therewith, a coil responsive to fluctuations in said main circuit and a second coil in inductive relation thereto in series with said battery.

6. In an electrical system of distribution, a main generator, a main distribution circuit connected thereto, a battery and booster in operative relation therewith, means for regulating the action of said booster responsive to variations in the electrical condition of the system, a coil responsive to fluctuations in said main circuit and a second coil in inductive relation thereto in series with said battery.

7. In an electrical system of distribution, a main generator, a main distribution circuit connected thereto, a battery and its circuit in operative relation thereto and a plurality of boosters in series with the battery, one of which is responsive to the rate of change of load on the distribution circuit.

8. In an electrical system of distribution, a source of electrical energy, a distribution circuit supplied thereby, a battery and its circuit in operative relation thereto, and a plurality of boosters for controlling the battery action, one of which is responsive to the rate of change of load upon the distribution circuit.

9. In an electrical system of distribution, a generator and distribution circuit connected thereto, a battery and its circuit in operative relation therewith and a coil and a booster in series with said coil for controlling the charge and discharge of the battery, said coil being responsive to the rate of change of load on the distribution circuit.

10. In an electrical system of distribution, a generator and distribution circuit connected thereto, a battery and its circuit in operative relation therewith, and a plurality of boosters for controlling the battery action, one of which is responsive to changes in the electrical condition of the system and another of which is responsive to the rate of change of load upon the distribution circuit and embraces a coil in inductive relation with the current of said distribution circuit.

11. In an electrical system of distribution, a generator, a direct current distribution circuit supplied thereby, a battery and its circuit in operative relation thereto, a booster and an independent coil in series therewith for regulating the charge and discharge of the battery responsive to the rate of change of load upon said distribution circuit.

12. In an electrical system of distribution, a suitable source of electrical energy, a distribution circuit supplied thereby, a battery and its circuit in operative relation thereto, a booster and its controlling means for the system, and a transformer having one element in operative relation to the main distribution circuit and the other element in operative relation to the battery circuit independent of the booster.

13. In an electrical system of distribution, the combination of a main distribution circuit, a battery and its circuit in operative relation thereto, and a transformer having its primary in series in the main distribution and its secondary in series in the battery circuit.

14. In an electrical system of distribution, the combination of a main distribution circuit, a battery and its circuit in operative relation thereto, and a boosting device for the battery provided with a coil in series in the main distribution circuit and a second coil in inductive relation to the first mentioned coil and in series with the battery.

15. In an electrical system of distribution, the combination of a main distribution circuit, a battery and its circuit in operative relation thereto, and a booster acting only while the current in the main distribution circuit is changing and producing an electromotive force in series with the battery.

16. In an electrical system of distribution, the combination of a main distribution circuit, a battery and its circuit in operative relation thereto, and a booster responsive to changes in the electrical condition of the system and acting only during such changes, and provided with means for producing an electromotive force in series with the battery.

17. In an electrical system of distribution, the combination of a main distribution circuit, a battery and its circuit in operative relation thereto, and a booster responsive to changes in the electrical condition of the system and operating only during such changes, and provided with coils in inductive relation to each other.

In testimony whereof, I have signed my name to this specification, in the presence of two subscribing witnesses.

WILLIAM A. TURBAYNE.

Witnesses:
  A. B. BRIMMER,
  C. C. EASTERBROOKS.